US008453115B2

(12) United States Patent
Murray et al.

(10) Patent No.: US 8,453,115 B2
(45) Date of Patent: May 28, 2013

(54) AUTOMATIC DATA MANIPULATION TO INFLUENCE CODE PATHS

(75) Inventors: Norman S. Murray, Brisbane (AU); Wade A. Mealing, Brisbane (AU)

(73) Assignee: Red Hat, Inc., Raleigh, NC (US)

( * ) Notice: Subject to any disclaimer, the term of this patent is extended or adjusted under 35 U.S.C. 154(b) by 1255 days.

(21) Appl. No.: 11/796,364

(22) Filed: Apr. 27, 2007

(65) Prior Publication Data

US 2008/0270997 A1 Oct. 30, 2008

(51) Int. Cl.
*G06F 9/44* (2006.01)

(52) U.S. Cl.
USPC .......................................................... 717/124

(58) Field of Classification Search
None
See application file for complete search history.

(56) References Cited

U.S. PATENT DOCUMENTS

| | | | | |
|---|---|---|---|---|
| 6,002,869 A * | 12/1999 | Hinckley | | 717/124 |
| 6,145,121 A * | 11/2000 | Levy et al. | | 717/135 |
| 6,698,012 B1 * | 2/2004 | Kossatchev et al. | | 717/126 |
| 6,907,546 B1 * | 6/2005 | Haswell et al. | | 714/38.11 |
| 6,931,629 B1 * | 8/2005 | Yount et al. | | 717/126 |
| 7,194,664 B1 * | 3/2007 | Fung et al. | | 714/45 |
| 7,257,805 B2 * | 8/2007 | Gritter | | 717/129 |
| 7,401,322 B1 * | 7/2008 | Shagam et al. | | 717/128 |
| 7,546,598 B2 * | 6/2009 | Blumenthal et al. | | 718/1 |
| 7,603,660 B2 * | 10/2009 | Davia et al. | | 717/128 |
| 7,610,578 B1 * | 10/2009 | Taillefer et al. | | 717/124 |
| 8,185,877 B1 * | 5/2012 | Colcord | | 717/127 |
| 2003/0025736 A1 * | 2/2003 | Kuth | | 345/772 |
| 2003/0088854 A1 * | 5/2003 | Wygodny et al. | | 717/130 |
| 2004/0133881 A1 * | 7/2004 | Chamberlain et al. | | 717/125 |
| 2004/0260930 A1 * | 12/2004 | Malik et al. | | 713/176 |
| 2005/0034105 A1 * | 2/2005 | Hind et al. | | 717/130 |
| 2005/0071834 A1 * | 3/2005 | Gates et al. | | 717/153 |
| 2005/0283676 A1 * | 12/2005 | Begg et al. | | 714/38 |
| 2006/0041864 A1 * | 2/2006 | Holloway et al. | | 717/124 |
| 2006/0095312 A1 * | 5/2006 | Conti et al. | | 705/10 |
| 2006/0101418 A1 * | 5/2006 | Barsness et al. | | 717/130 |
| 2006/0101421 A1 * | 5/2006 | Bodden et al. | | 717/130 |
| 2007/0226698 A1 * | 9/2007 | Cascaval et al. | | 717/127 |
| 2007/0240118 A1 * | 10/2007 | Keren | | 717/124 |
| 2008/0052695 A1 * | 2/2008 | Dickenson et al. | | 717/151 |
| 2008/0092123 A1 * | 4/2008 | Davison et al. | | 717/128 |
| 2008/0172652 A1 * | 7/2008 | Davia et al. | | 717/124 |
| 2008/0184206 A1 * | 7/2008 | Vikutan | | 717/127 |
| 2008/0270997 A1 * | 10/2008 | Murray et al. | | 717/131 |

* cited by examiner

*Primary Examiner* — Wei Zhen
*Assistant Examiner* — Adam R Banes
(74) *Attorney, Agent, or Firm* — Lowenstein Sandler LLP

(57) ABSTRACT

Software development and testing systems use adaptive feedback to construct an input dataset for a target program. The target's operation is monitored to identify significant events that correlate with the input dataset. Critical events are detected and reported to a user. Various methods of implementing the adaptive feedback, and systems that can be tested using these methods, are also described.

20 Claims, 6 Drawing Sheets

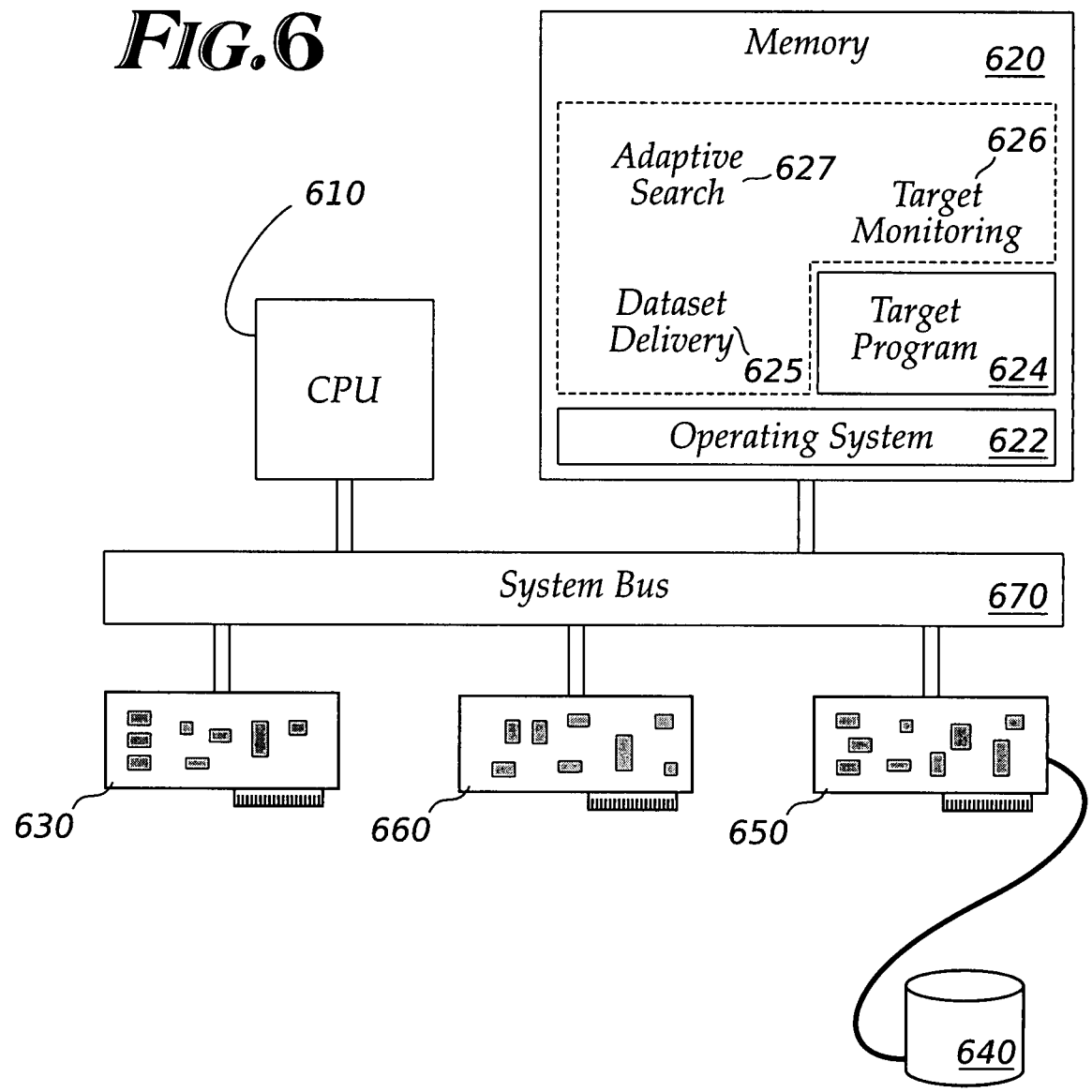

AUTOMATIC DATA MANIPULATION TO INFLUENCE CODE PATHS

FIELD

The invention relates to software testing. More specifically, the invention relates to automated methods for identifying exploitable programming errors.

BACKGROUND

Modern computer programs are often enormously complex logical systems, designed to perform some useful function based on one or more input data streams. A program may operate correctly when the input data streams are close to what the program's designer anticipated, but some unexpected configurations of data may cause the program to operate erratically or to crash. Since erratic program operation may expose data or protected facilities in an undesirable way, malicious users often seek out data streams that cause unexpected behavior. Similarly, programmers hoping to improve the security and robustness of their programs may also search for problematic data input streams, as these can often help locate bugs and incorrect assumptions embodied in the code.

Software testing traditionally has relied on hand-specification of input streams based on a priori knowledge of the expected input structure. For example, if a program is designed to receive a text string at a certain point in its input, the tester might provide a text string with unusual characters (e.g., two-byte characters from an Asian character set), or a zero-length string, or an extremely long string. A "correct" or "expected" response to the given input is specified, and the program's actual response is compared to the expected response to determine whether the program is behaving properly. As a program is refined and extended, a library of these test inputs may be collected, and a new version of the program may be qualified by confirming that it produces the expected responses to all of the test inputs.

This testing method is effective for finding errors that have directly-observable consequences, but it can miss many other classes of errors. In addition, it is often a time-consuming task to design a set of tests that provide adequate coverage of so-called "boundary cases:" tests that exercise the program when various portions of its state are at or near minima or maxima. (For example, a banking program that used a sixteen-bit integer to hold an account balance would need extensive testing for balances near $-32,768$ ($-2^{15}$) and $32767$ ($2^{15}-1$)).

Automated approaches that can provide more comprehensive testing may be of use in detecting subtle programming errors.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

FIG. 6 shows some components and subsystems of a computer system that implements an embodiment of the invention.

DETAILED DESCRIPTION

An embodiment of the invention manipulates data streams provided to an application and monitors the application's response. When a change to a data stream elicits a different response, further data manipulations in the vicinity of the change are tested to determine whether the different response is actually indicative of an underlying error. A report identifying critical points in a data stream may be produced to facilitate post-mortem analysis of program operation.

Figure 1:
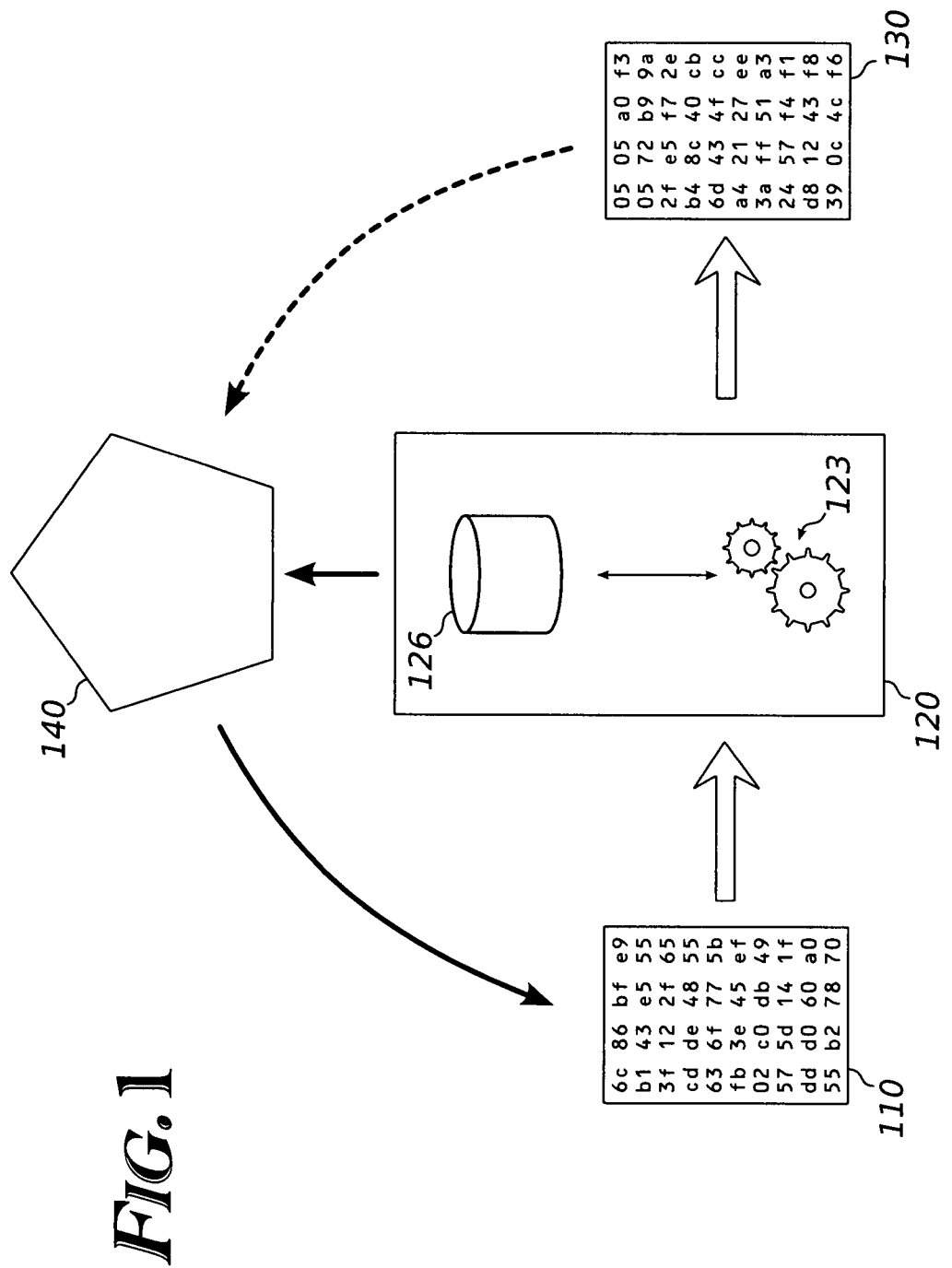
FIG. 1 shows an overview of relationships between entities involved in an embodiment of the invention.

FIG. 1 shows a representation of a simple "filter" style program that can be analyzed by an embodiment of the invention. An input data stream 110, depicted here as an array of hexadecimal numbers, is supplied to program 120. Internal program logic 123 refers to information from data stream 110 and information in program state 126, eventually producing output stream 130. Traditional testing simply confirms that a given input stream produces an expected output stream. However, this may fail to account for the effect of program state 126 on the program's operation. Thus, for example, if a first portion of an input stream can place program state 126 into an unexpected condition, a later portion of the input stream may be able to exploit the unexpected condition. The exploit may appear as a side effect elsewhere in the operation of the program or its surrounding system, and not necessarily in the output 130. For this reason, testing systems that focus only on expected outputs given known inputs can overlook many types of programming errors.

An embodiment of the invention, represented here as a separate logic block 140, can repeatedly invoke program 120, altering the data in input stream 110 on each occasion, according to methods described below. The embodiment monitors the operation of program 120 via one or more facilities discussed below, and may also examine output stream 130. This approach provides additional insight into the operation of the program and helps to flush out latent bugs.

Figure 2:
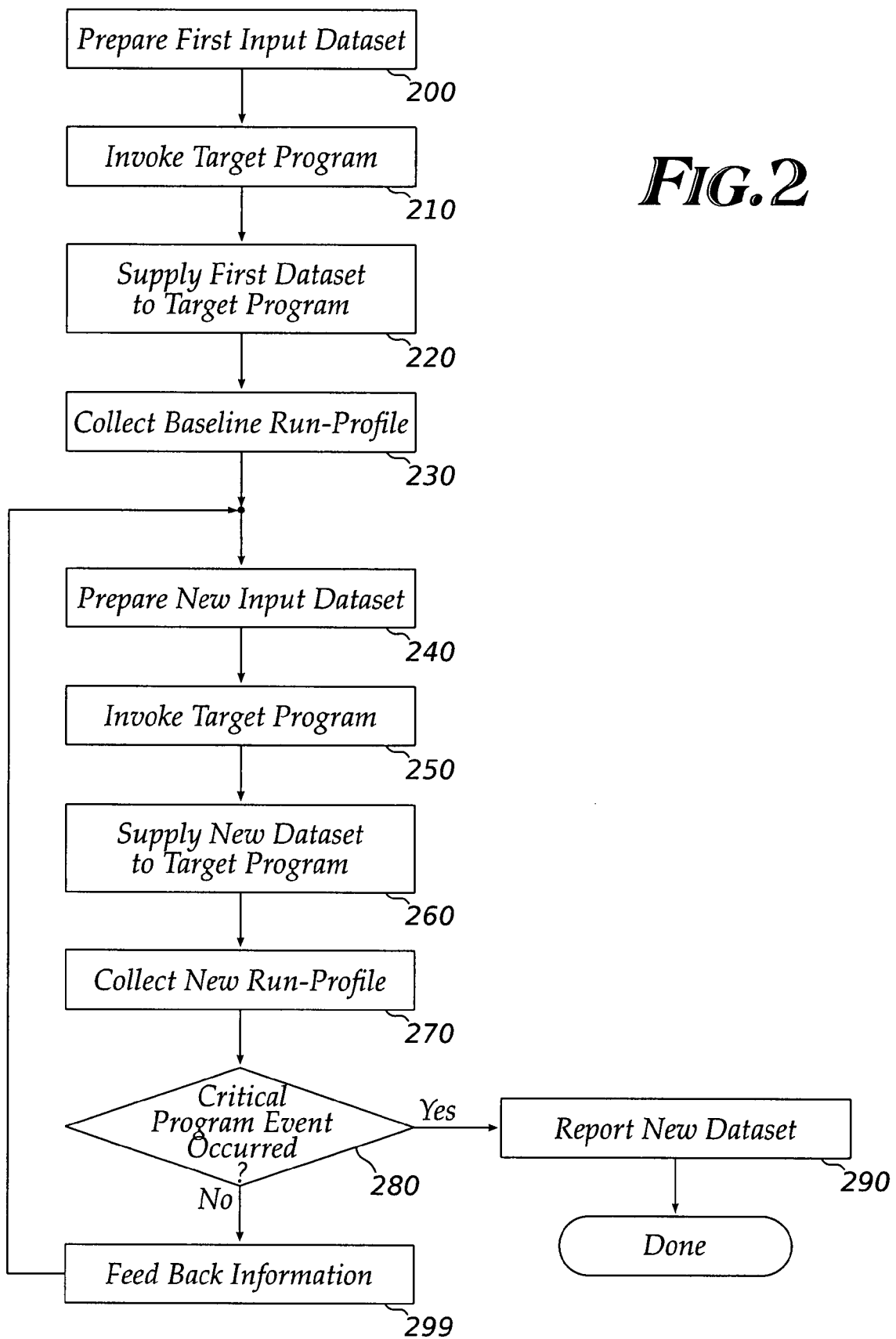
FIG. 2 is a flow chart outlining operations according to an embodiment.

FIG. 2 is a flow chart that outlines operations of an embodiment of the invention. A first input dataset is prepared (200) and the target program is invoked (210). The first dataset is supplied to the program (220) and a baseline run-profile of the program is made (230). Then, operating repetitively (e.g., iteratively or recursively), an embodiment prepares a new dataset based on an earlier dataset (240), invokes the program again (250), supplies the new dataset (260) and collects a new run-profile (270). If the new dataset causes a critical program event (e.g., an abnormal termination, program crash or similar anomaly) (280), the new dataset is reported out for further analysis (290). Otherwise, information gathered during the program invocation and processing of the new dataset is fed back to the dataset preparation process (299) to guide the preparation of subsequent datasets.

Figure 3:
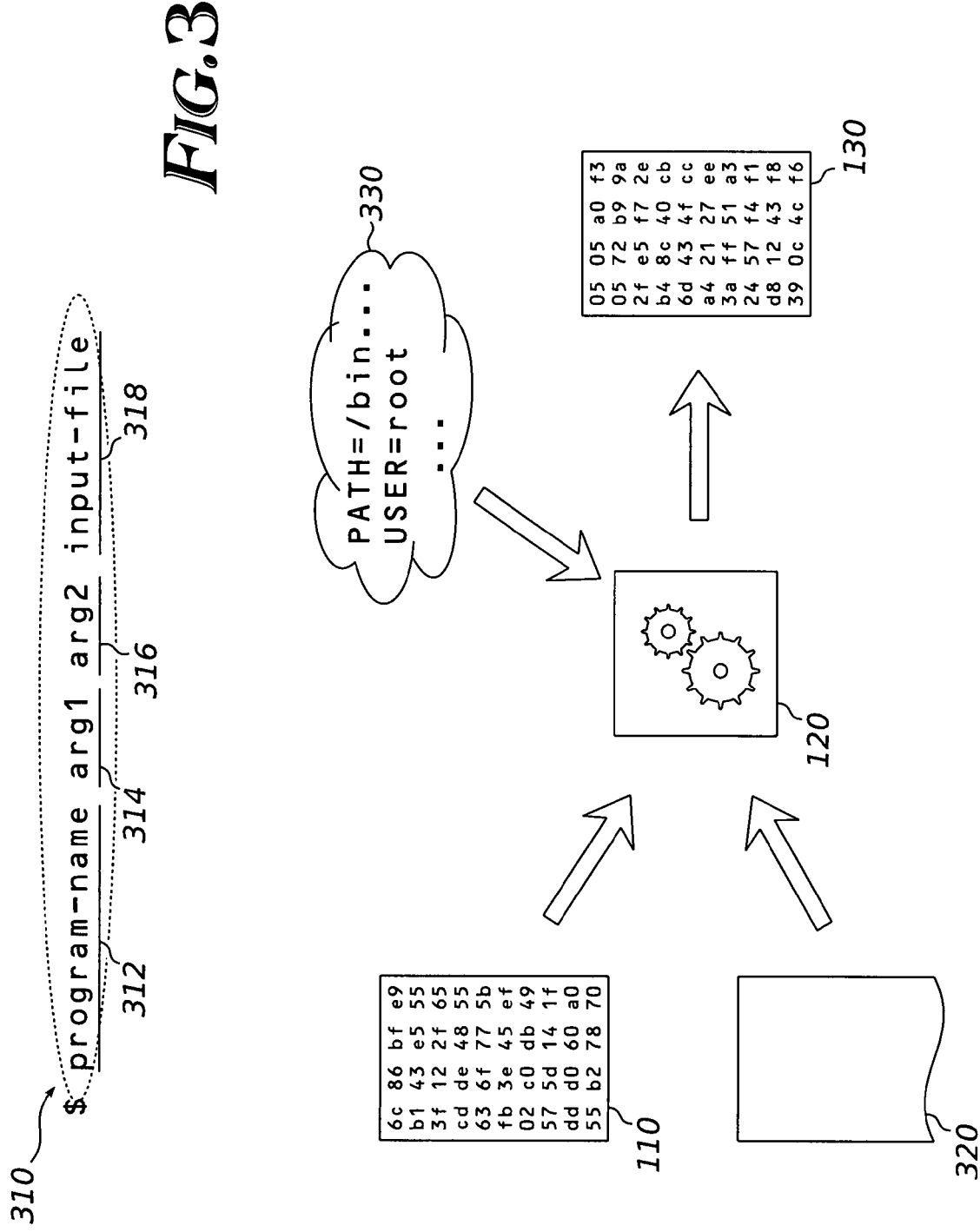
FIG. 3 illustrates several different mechanisms through which input data may be supplied to a target program.

As used herein, "dataset" may include a number of different types of user-provided information that affect the operation of the target program. FIG. 3 shows some of these. A "command line" 310 directs an operating system ("OS," not shown) to begin executing a program 120. Command line 310 includes a name 312 or other identifier of the program, command-line arguments 314 and 316, and another name or identifier 318 that the target program may use to access an input data file 320. When a program is invoked in many environments, it can also receive a stream of data 110 as a "standard input." Finally, in this example, program 120 may obtain additional information to adjust its operation from a data repository 330 that is often called the program's "environment."

Not all programs refer to all of these different input data sources, and some programs may obtain some of the information they use in their operations from sources not shown in FIG. 3. For example, some programs may access data in a shared memory segment, and others may connect to a network server or database. Furthermore, some input data sources may direct the program to obtain further data from a secondary source. For example, a command-line argument may specify an input file, and information in the input file may cause the program to download data from a web server. Input datasets may also incorporate a "time" dimension. For example, a target program may write data to a temporary file during its operation, and later read that data back. An embodiment of the invention can tamper with the read or write operation, or with the temporary file, so that the target program reads different data from the temporary file. This may induce unusual program behavior that can help to identify vulnerabilities or logic errors.

However it is specified or described to a program, all of the input data can be viewed in the aggregate as an input dataset. Embodiments of the invention prepare a series of datasets, invoke the target program, provide a dataset and observe the program's behavior, as explained in further detail below. For simplicity, an input dataset will be discussed as if it was an ordinary array or stream of data bytes, although it is understood that portions of the array may be split up and delivered to a target program through various different mechanisms and/or at various different times.

During a testing cycle with an input dataset, the operation of a target program may be monitored from one or more vantage points. A basic embodiment may do no more than observe the program's output (like the program's input, its output may also be delivered through several different mechanisms: messages printed out, files created or modified, network messages sent, and so on). Other embodiments may use system facilities to track operating system calls made by the program, memory allocated and freed by the program, signals sent and received by the program, system load (e.g., processing cycles) dedicated to the program, etc. Many of these facilities are used for software development and debugging, and will be familiar to those of skill in the relevant arts. No further description is necessary here.

Information gathered by monitoring the target program as it processes the input dataset is collected into a "run profile" that describes what the program does, and when it does it. Embodiments may collect very detailed run profiles (e.g., lists of every subroutine called, or even every instruction executed); or more generalized run profiles (e.g., lists of files opened, or start and stop times). Run profiles usually contain the same sorts of measurements from each test, to facilitate comparisons between profiles.

Figure 4:
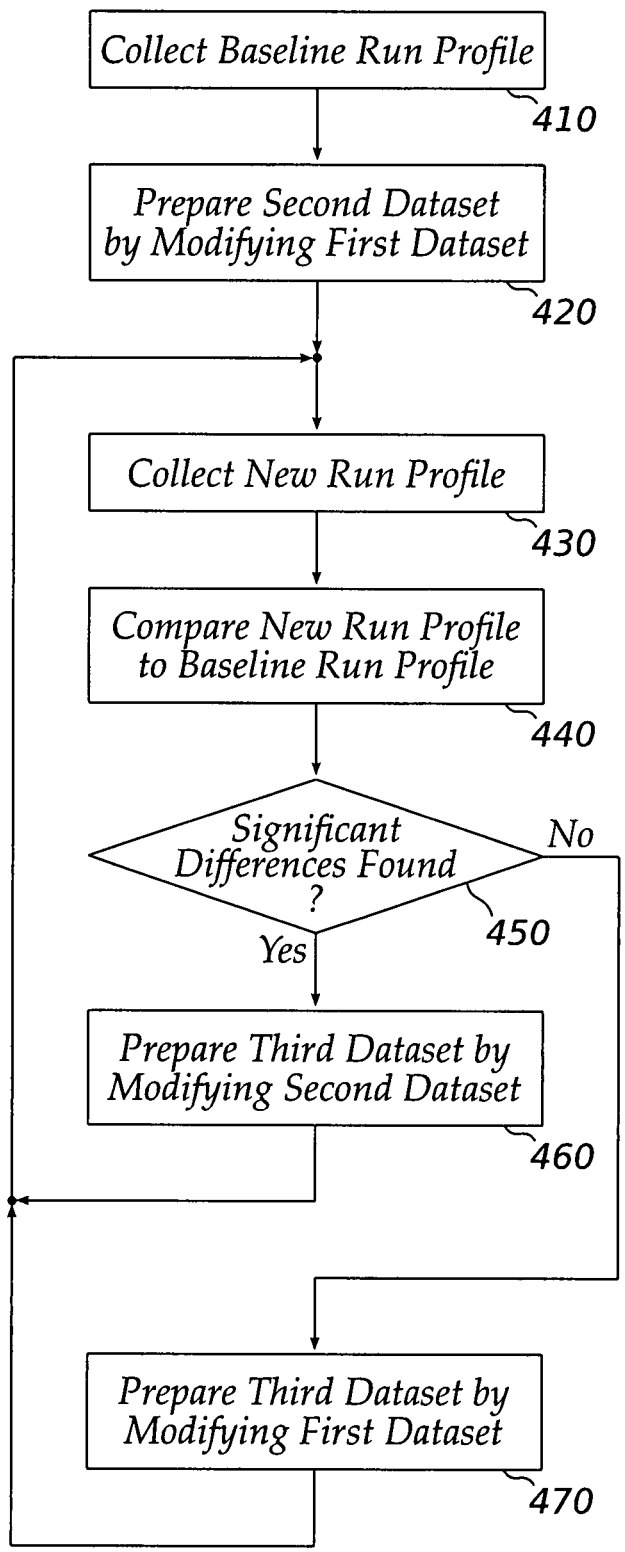
FIG. 4 is a flow chart detailing a portion of a method according to an embodiment of the invention.

After a baseline run-profile is collected, an embodiment performs repeated tests using modified input datasets and compares the run-profiles collected during these tests with the baseline run-profile and/or with run-profiles corresponding to different datasets. An input dataset is prepared based on one or more previous datasets according to the partial algorithm outlined in FIG. 4. As described in reference to FIG. 2, a baseline run profile is collected (410) by monitoring the program as it processes a first input dataset. A second input dataset is prepared by making a first modification to the first input dataset (420), and a new run profile is collected (430). The new run profile is compared to the baseline run profile (440), looking for significant differences. If there are significant differences (450), a third new input dataset is prepared by making a second modification to the second input dataset (460). If no significant differences are found, a third new input dataset is prepared by making a second, different modification to the first input dataset (470). This process is repeated with the third new input dataset, and so on, until a critical program event occurs or enough tests have been conducted to give an adequate degree of confidence in the robustness of the program.

The process described above with reference to FIG. 4 is an adaptive search with feedback, designed to find modifications to an input dataset that cause significant differences in program operation, and (ideally) to induce critical program events. It is difficult to represent such a search graphically with a simple linear flow chart, although the adaptive search process is not especially complex. A goal of the search is to identify locations and values in the input dataset that cause significant differences in a program's run-profile. As an example of a significant difference, consider a program that receives a name as part of its input. If one input dataset provides the name "Alice," then modifications to the input dataset that provide the name "David" instead are unlikely to cause the program to operate differently, i.e., there will be no significant differences in the run profiles. However, an input dataset that provides a non-printable character in the name may cause the program to enter a different code path: for example, performing an error-handling routine instead of its normal operations upon receiving a name. This can be detected by some monitoring methods, and may be considered a significant difference. It should be noted that some embodiments of the invention operate without regard to the semantic structure of an input dataset—the "name" example above is intended to facilitate understanding of the invention, not to suggest that embodiments prepare datasets that conform to the structures expected by the target program. In fact, it is often found that datasets that do not conform to expected structures are the ones that produce the most interesting run profiles.

A critical program event may be what is colloquially known as a "crash:" the program enters a state from which it cannot continue, and (usually) the operating system terminates the program and recovers any resources it was using. However, a program may continue executing after a critical program event, although its operation may not be in accordance with its designers' expectations. For example, the program may inadvertently disclose confidential data (e.g., print a password or alter an access restriction on a shared memory segment), or it may allow instructions "smuggled in" via the input dataset to execute with permissions that would not ordinarily be available to the testing process that implements an embodiment of the invention (i.e., a privilege escalation violation). Often, a crash indicates a programming error that can be exploited for a security leak or privilege escalation by a carefully-designed input dataset. An embodiment of the invention need not construct a dataset to exploit the bug; it is usually sufficient to identify a dataset that merely causes the program to crash. Once the location or vicinity of an error is known, manual debugging techniques can be used to determine the limits of the error and to correct it.

An embodiment of the invention may search for input dataset modifications that produce significant or critical program events breadth-first, depth-first or a combination of the two. In a breadth-first search, after a first interesting modification to an earlier input dataset is found, the next dataset contains a different modification of the earlier input dataset (the first interesting modification is removed). Once an adequate number of interesting single modifications are found, an embodiment might continue to search by using the dataset with the first modification as a basis, and testing a series of second modifications.

In a depth-first search, once a first interesting modification is found, the modified dataset is further altered with a second modification. When a second interesting modification is found, the process recurses to find a third interesting modification to the dataset containing the first and second modifications.

Since input datasets commonly contain thousands or millions of bytes, it would be impractical to test each possible combination. Embodiments may use a number of different techniques to select modifications for testing. One technique is to apply a random mutation (insertion, deletion or replacement) of one or more data bytes in an input dataset. If the random mutation elicits a significant difference in the program's run-profile, the modified dataset may be subjected to further random mutations to perform the recursive, depth-first search mentioned above.

Figure 5:
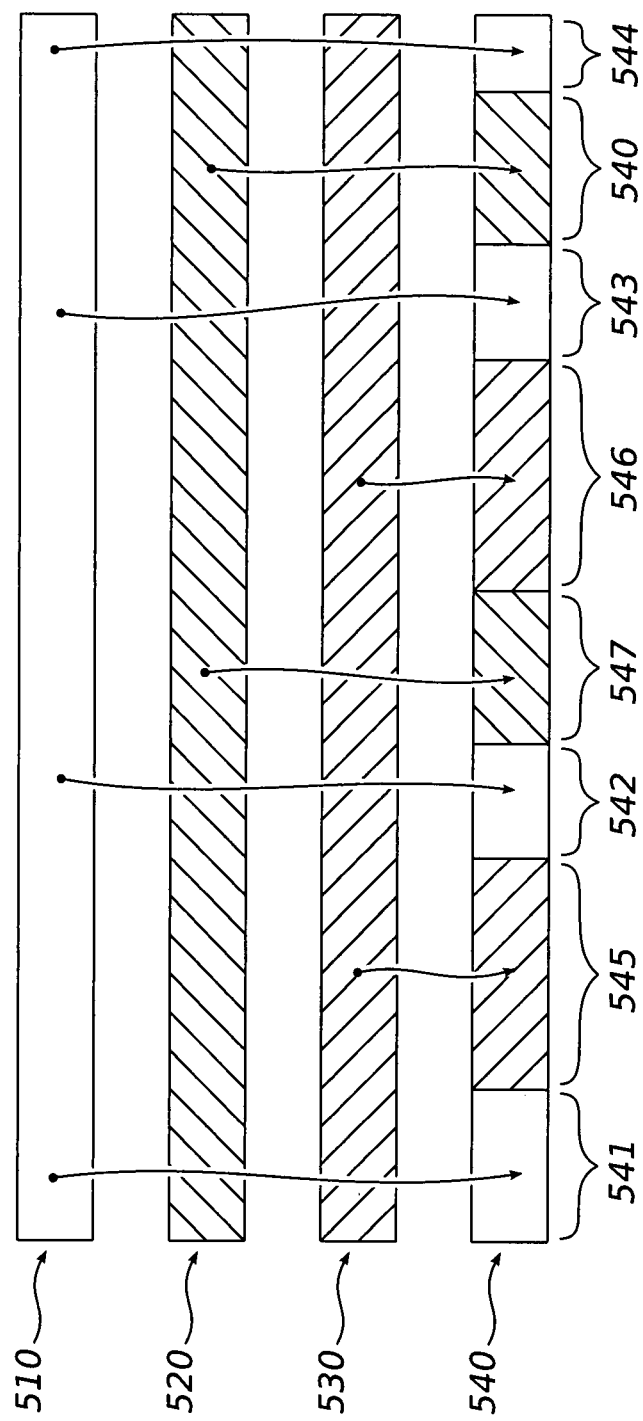
FIG. 5 shows one way to construct a new input dataset from several existing datasets.

Another technique is to combine segments of two or more different input datasets, as shown in FIG. 5. In this example, portions of three different input datasets 510, 520 and 530 are chosen at random and combined into dataset 540. In some embodiments, it may be effective to choose segments that begin and end at or near locations in the data stream where random point mutations (as described above) have elicited significant differences in the program's run-profile. This method of producing input datasets is patterned on the techniques of genetic algorithms ("GA"). An embodiment of the invention may prepare a plurality of initial datasets (in GA terms, an "initial population"). Each dataset is provided to an invocation of the target program, and a run profile corresponding to the input dataset is collected. Then, the "best" input datasets are selected from the initial population and a new plurality of datasets is created by mixing and/or applying point mutations to the initial population. The second population is similarly tested, and the best individuals are selected to produce a third generation. A "fitness function" is used to select the best input datasets. For an embodiment of the invention, one possible fitness function counts the number of significant and/or critical program events elicited by an input dataset.

To produce an initial dataset, an embodiment may start with a known-good dataset such as a traditional test dataset. In some environments, and for some target programs, it may be possible to present random data to the program as a dataset. Other methods of creating and modifying input datasets will be apparent to those of skill in the relevant arts.

Invoking the test program was only briefly mentioned above, but embodiments of the invention may use several different techniques. In addition to simply executing the program, an embodiment may present a plurality of requests to a long-lived program. For example, to test a web server, an embodiment of the invention may make a number of successive network connections (using a data protocol such as the Transmission Control Protocol and Internet Protocol, "TCP/IP") and transmit Hypertext Transfer Protocol ("HTTP")-like requests. Each such request may be considered as a separate input dataset. Since the web server is a long-lived program, one dataset may induce an unexpected state in the program that later manifests as a significant or critical event when a second dataset is presented. Database servers and network file or storage servers are additional examples of long-lived programs that, by design, accept and service a series of client requests. Each client request can be treated as a separate input dataset according to the methods of an embodiment of the invention.

It is appreciated that many programs rely on common sets of subroutines known as system libraries. An embodiment of the invention can be used to test these system library subroutines through an "interface" provided by any target program. In other words, if testing of a first target program succeeds in identifying an input dataset that causes a program crash, confidential data disclosure or privilege escalation violation, and subsequent analysis shows that the programming error lies in a system library, then it is possible that a similar vulnerability exists in every program that uses the same system library. Once a library defect is identified, traditional software analysis techniques may be used to work backwards from a call to the library in a program, to design an input dataset that triggers the defect when presented to another program.

FIG. 6 shows some components and subsystems of a computer system that implements an embodiment of the invention. Central processing unit ("CPU") 610 is a programmable processor that executes instructions stored in memory 620 to perform methods according to embodiments of the invention. Memory 620 contains data and instructions (generally, "software") to implement various logical functions. For example, an operating system ("OS") 622 may coordinate the operations of other software entities and manage access to the system's hardware resources. Target program 624 is executed one or more times under the OS's control according to an embodiment of the invention. An embodiment may contain functionality including dataset delivery logic 625 to send an input dataset to target program 624, and target monitoring logic 626 to monitor the target program and produce run profiles. Adaptive search logic 627 prepares new input datasets based on previous datasets and the run profiles collected by target monitoring logic 626.

The computer system may also include hardware components such as a network interface 630, a mass storage device 640 and its associated hardware controller 650, and a video adapter 660. The various components and subsystems communicate to exchange commands and data via a system bus 670.

In some embodiments, logical functionality may be distributed across a number of independent machines, with operations of various portions coordinated via network communications. For example, target monitoring logic may reside on a first machine with a target program such as a web server, while adaptive search and dataset delivery logic operates on a second machine, delivering input datasets (e.g., HTTP requests) to the web server over a network connection.

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that automatic data manipulation to influence code paths can also be implemented by software and hardware that distribute the functions of embodiments of this invention differently than herein described. Such variations and implementations are understood to be captured according to the following claims.

The invention claimed is:

1. A method comprising:
    collecting, by a programmable processor, a first run profile of a computer program processing a first dataset;
    altering, by the programmable processor, the first dataset to produce a second dataset;
    collecting, by the programmable processor, a second run profile of the computer program processing the second dataset;
    determining, by the programmable processor, whether there is a code path that is different between the second run profile and the first run profile;
    when the code path is different between the second run profile and the first run profile, modifying, by the programmable processor, the second data set to produce a modified second data set; and
    when the code path is not different between the second run profile and the first run profile, modifying, by the programmable processor, the first data set to produce a modified first data set, wherein the modified first data set is different from the second data set.

2. The computer-implemented method of claim 1, further comprising:
    repetitively preparing a subsequent dataset and collecting a run profile of the computer program processing the subsequent dataset.

3. The computer-implemented method of claim 2, further comprising:
    monitoring the subject program for an occurrence of a critical program event; and
    reporting the critical program event.

4. The computer-implemented method of claim 3 wherein the critical program event is one of a program crash, a privilege escalation violation or a disclosure of protected information.

5. The computer-implemented method of claim 1 wherein altering the first dataset comprises inserting, deleting or replacing one or more bytes of the first dataset.

6. The computer-implemented method of claim 1 wherein modifying one of the first dataset or the second data set comprises introducing a point mutation to the first dataset or the second dataset.

7. A non-transitory machine-readable medium storing instructions that when executed by a programmable processor cause the programmable processor to perform operations comprising:

collecting, by the programmable processor, a first run profile of a computer program processing a first data set;

collecting, by the programmable processor, a second run profile of the computer program processing the second dataset;

determining, by the programmable processor, whether there is a code path that is different between the second run profile and the first run profile; and when the code path is different between the second run profile and the first run profile, modifying, by the programmable processor, the second data set to produce a modified second data set; and when the code path is not different between the second run profile and the first run profile, modifying, by the programmable processor, the first data set to produce a modified first data set, wherein the modified first data set is different from the second data set.

8. The machine-readable medium of claim 7 wherein the operations further comprise:

monitoring the computer program for an occurrence of a critical program event; and reporting the critical program event.

9. The machine-readable medium of claim 7 wherein the operations further comprise:

repeatedly invoking, by a computer system, a subject program;

providing an input dataset to the subject program on each invocation.

10. The machine-readable medium of claim 9 wherein providing the input dataset to the computer program comprises transmitting input data to the computer program via a network connection.

11. The machine-readable medium of claim 10 wherein the computer program is to receive a Hypertext Transfer Protocol ("HTTP") request from a client via the network connection.

12. The machine-readable medium of claim 10 wherein the computer program is to receive a database request from a client via the network connection.

13. The machine-readable medium of claim 10 wherein the computer program is to receive a file storage request from a client via the network connection.

14. The machine-readable medium of claim 9 wherein invoking comprises executing the program.

15. The machine-readable medium of claim 9 wherein invoking comprises establishing a network connection to a long-lived program.

16. The machine-readable medium of claim 15 wherein the long-lived program is to respond to sequential requests from a series of clients.

17. A system comprising:

a memory; and a programmable processor coupled to the memory, the programmable processor collects a first run profile of a computer program processing a first data set, alters the first data set to produce a second data set, determines whether there is a code path that is different between the second run profile and the first run profile, when the code path is different between the second run profile and the first run profile, modify the second data set to produce a modified second data set; and when the code path is not different between the second run profile and the first run profile, modify the first data set to produce a modified first data set, wherein the modified first data set is different from the second data set.

18. The machine-readable medium of claim 9 wherein providing the input dataset to the subject program comprises at least one of:

providing input data as a command-line argument;

providing input data as an input file name; providing input data as a sequence of bytes to be read by the program; or providing input data as an environment variable.

19. The machine-readable medium of claim 8 wherein the critical program event is one of a program crash, a privilege escalation violation or a disclosure of protected information.

20. The machine-readable medium of claim 7 wherein altering the first dataset comprises inserting, deleting or replacing one or more bytes of the first dataset.

* * * * *